United States Patent [19]

Kawai et al.

[11] Patent Number: 4,669,149
[45] Date of Patent: Jun. 2, 1987

[54] FILLING NOZZLE DEVICE FOR USE IN AUTOMATIC MEAT STUFFING APPARATUS

[75] Inventors: Keiichi Kawai; Setsuo Yasuda; Zenichiro Sakaime, all of Osaka, Japan

[73] Assignee: Futabadenki Kogyo Kabushiki Kaisha, Osaka, Japan

[21] Appl. No.: 879,566

[22] Filed: Jun. 27, 1986

[30] Foreign Application Priority Data

Sep. 9, 1985 [JP] Japan .................................. 60-199148

[51] Int. Cl.4 ............................................. A22C 11/02
[52] U.S. Cl. ............................................. 17/33; 17/41
[58] Field of Search .......................... 53/122, 576, 581; 17/41, 42, 49, 1 R

[56] References Cited

U.S. PATENT DOCUMENTS 3,919,739 11/1975 Kawai .................................. 17/49 X
4,558,486 12/1985 Nakamura .......................... 17/42 X Primary Examiner—Willie G. Abercrombie
Attorney, Agent, or Firm—Antonelli, Terry & Wands

[57] ABSTRACT

A filling nozzle device used in association with an automatic meat stuffing machine, the nozzle device including a stationary nozzle, a sliding nozzle slidable on the stationary nozzle and a plurality of split nozzle members arranged around the stationary nozzle in such a manner that their top portions are inwardly urged and positioned within a casing holding means. The sliding nozzle advances to expand the split nozzle members so as to locate the casing between the nozzle members and the casing holding means, thereby placing the casing in contact with the outer surface of the sliding nozzle.

3 Claims, 6 Drawing Figures

4,669,149

FILLING NOZZLE DEVICE FOR USE IN AUTOMATIC MEAT STUFFING APPARATUS

BACKGROUND OF THE INVENTION

1. Field of the Invension

The present invention relates to a filling nozzle device for use in association with an automatic meat stuffing apparatus, and more particularly to a filling nozzle device for such use, the device allowing the meat to be in the state of lump or paste.

2. Description of the Prior Art

The inventor invented an automatic meat stuffing apparatus in which a continuous band of tubular casing, hereinafter referred to merely as a casing, is carried on a carrier running axially of the nozzle of a meat extruder. The casing is held open around the nozzle during the return travel of the carrier to its starting position, and then the meat is extruded through the nozzle into the casing. After a predetermined amount of meat has been stuffed in the casing, the band of casing is cut away and its ends are automatically fastened into a cased meat, such as sausage. The previous invenstions are disclosed in Japanese Patent Publication (examined) No. 50(1975)-32315 (U.S. Pat. No. 3,919,739) and Japanese Patent Publication (examined) No. 52(1977)-27715.

However the prior art filling nozzle cannot avoid the liquids contained in the meat, such as meat juice and pickle injected therein, leaking through the open end of the casing when the meat is stuffed in the casing. In the previous nozzle devices referred to above a lump of meat is used, which contains a relatively small amount of liquids, such as meat juice and pickle. Nevertheless, there is a problem of leakage through the gaps around the nozzle. A paste of meat contains more liquid, and the problem of leakage will be argumented. This means that the previous nozzle devices are not applicable when the meat is in the state of paste.

An object of the present invention is to provide a filling nozzle for use in an automatic meat stuffing apparatus, the nozzle being applicable to meat either in the state of lump or paste.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description and drawings.

SUMMARY OF THE INVENTION

According to the present invention, there is provided a filling nozzle device for use in stuffing meat in a continuous tubular casing, the device comprising: a meat extruder; an inner nozzle secured to the meat extruder; an outer nozzle sliding on the inner nozzle; a casing holding means located ahead of the inner nozzle, and coaxially thereof, the holding means having an inside diameter larger than the outside diameter of the sliding nozzle; a plurality of split nozzle members arranged around the periphery of the inner nozzle in such a manner that their top portions are inwardly urged by an elastic material, and located within the casing holding means; a casing binding means provided ahead of the casing holding means, the binding means including a pair of punches adapted to affix a clip to the open end of the casing; a casing contact means including a pair of semi-circular abutments adapted to be kept in contact with the outer surface of the casing; and whereby the sliding nozzle is advanced until it projects through the casing contact means, in the course of advance it expands the split nozzle members so as to urge them toward the casing holding means until the casing is held between the split nozzle members and the casing holding means, and wherein the casing is kept in contact with the outer surface of the sliding nozzle by the casing contact means.

DETAILED DESCRIPTION OF THE INVENTION

Figure 1:
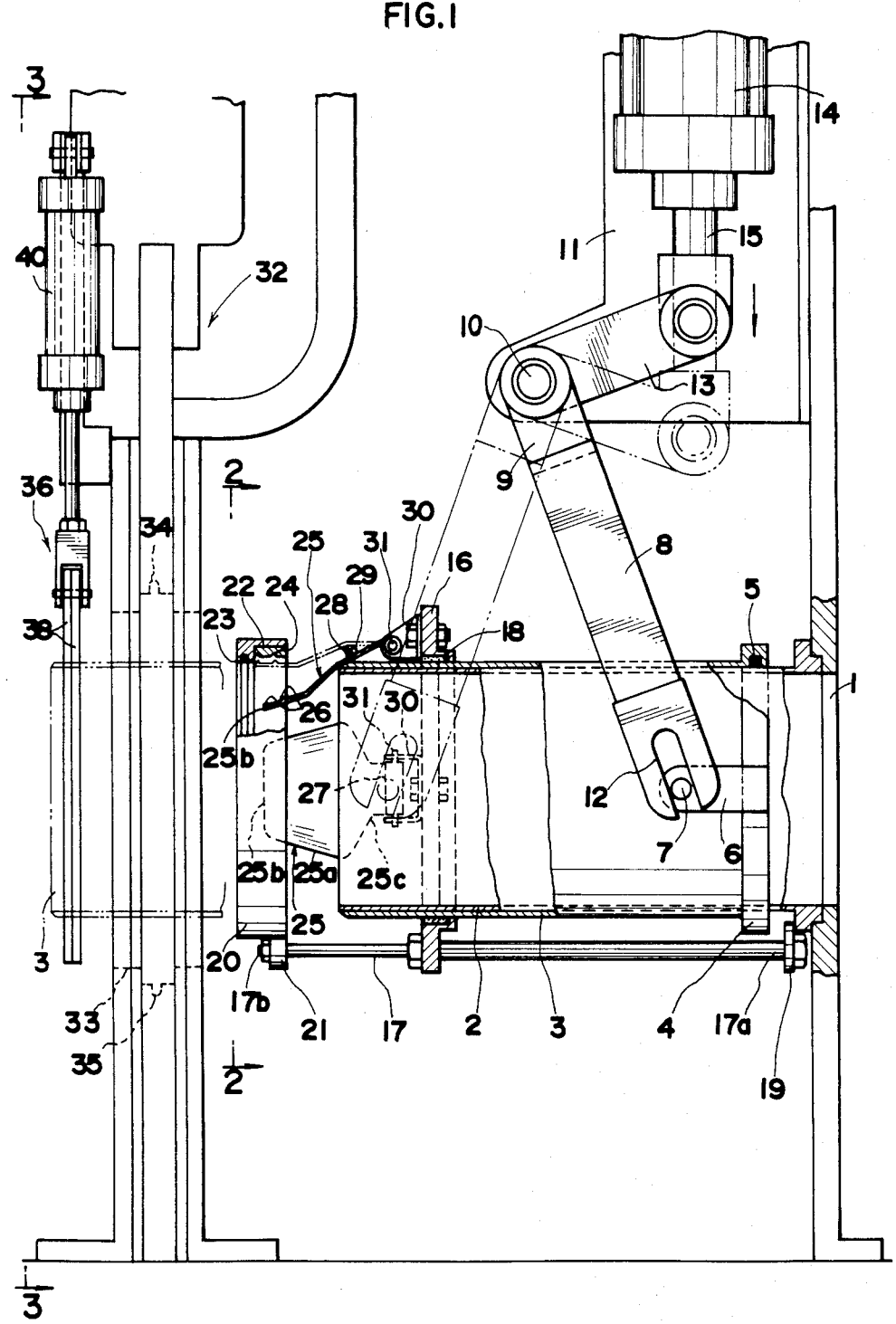
FIG. 1 is a partially cross-sectional front view showing a filling nozzle device embodying the present invention.
Figure 2:
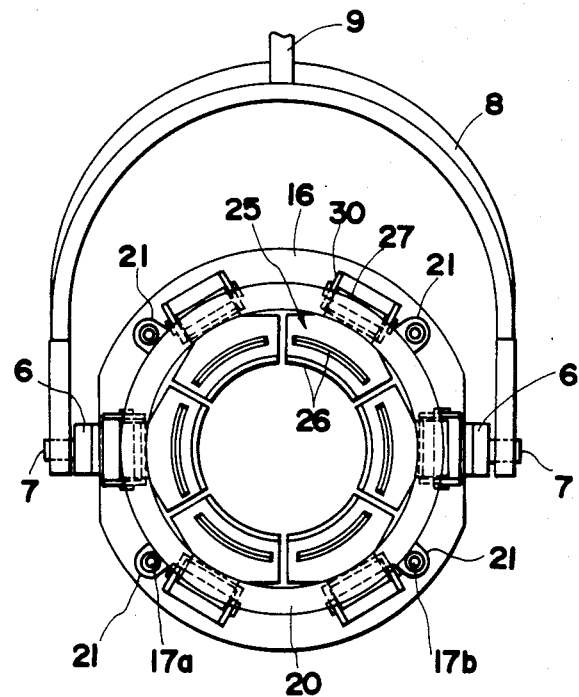
FIG. 2 is a side view viewed from the line 2—2 in FIG. 1.

The filling nozzle meant herein includes a stationary nozzle 2 fixed to an inlet port 1 through which meat is introduced into the extruder, and a movable or sliding nozzle 3 slidable on the outer surface of the stationary nozzle 2. Both nozzle are cylindrical. The sliding nozzle 3 is provided with a ring-shaped flange 4 at its tail portion, which flange accommodates a seal ring 5 keeping liquid-tight contact with the outside of the stationary nozzle 2. The flange 4 is provided with a pair of joint members 6 at opposite sides thereof. The reference numeral 8 denotes a yoke which engages the joint member in the following manner:

The yoke 8 takes the form of an inverted U-letter as best shown in FIG. 2, and has a support rod 9 projecting from its upmost periphery, where the support rod 9 is pivotally connected to a structure 11 by means of a shaft 10. The yoke 8 has grooves 12 at the respective terminating ends, at which pins 7 are fitted. The support rod 9 is pivotally connected to a link 13, which is connected to a piston rod 15 of a pneumatic cylinder 14 fixed to the structure 11. In accordance with the up-and-down movements of the piston rod 15 the link 13 is swung around the shaft 10, thereby enabling the sliding nozzle 3 to move reciprocally in its axial direction.

The reference numeral 16 denotes a ring fitted around the sliding nozzle 3. The ring 16 supports four shafts 17 arranged along its periphery, and is positioned concentrically of the two nozzles 2 and 3. There is provided another ring 18 interposed between the ring 16 and the outside of the sliding nozzle 3, the second ring 16 being adapted to guide the sliding nozzle 3. The shafts 17 passing through the ring 16 at equal spaces are jointed to a bracket 19 at their ends 17a, and to ear members 21 of a casing holder 20 at the opposite ends 17b. The casing holder 20 is located in front of the top ends of the nozzles 2 and 3.

Figure 4:
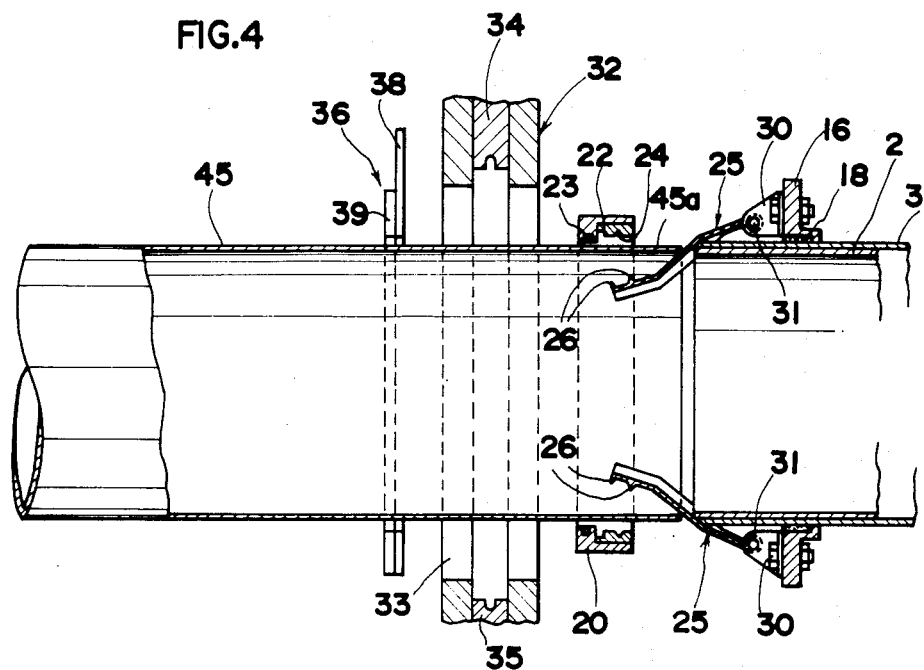
FIGS. 4 to 6 are views explaining the steps of operation of the device of FIG. 1.
Figure 5:
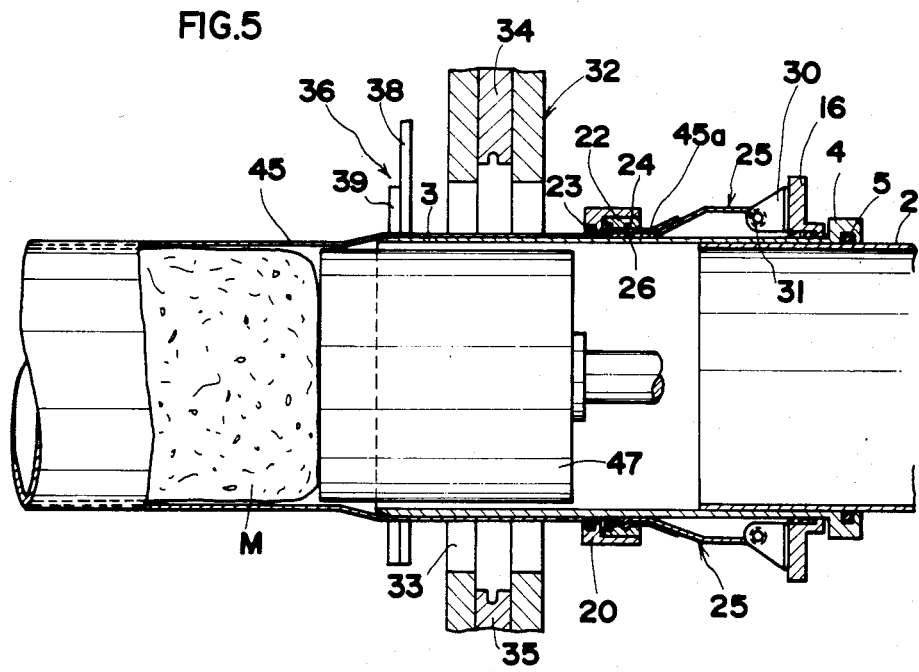
Figure 6:
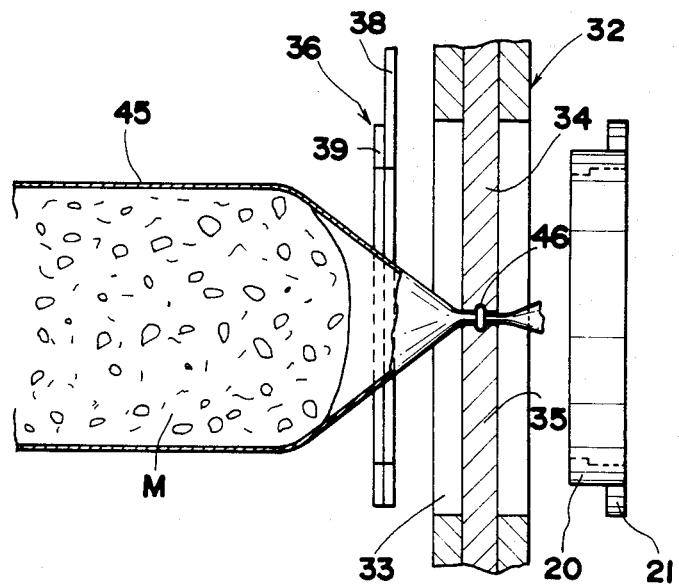

The casing holder 20 is cylindrical, and has the ear members 21, to which, as described above, the shafts 17 are fixed by means of nuts. Under this arrangement the casing holder 20 is positioned concentrically of the stationary nozzle 2. The casing holder 20 is lined with a ring liner 22 made of plastics, such as nylon, and provided with a sealing ring 23. The ring liner 22 has a larger inside diameter than the outside diameter of the sliding nozzle 3, and is provided with a groove 24, which engages pawls 26 of split nozzle members 25 (FIG. 4). The sealing ring 23 has an inside diameter equal to, or slightly smaller than the outside diameter of the sliding nozzle 3.

In the illustrated embodiment six split nozzle member 25 are provided, each of which is made of metal sheet by press-work. The member 25 has a fairly wide portion 25a, an increasingly narrowed top portion 25b slightly bent and extending forward, and a narrowed tail portion 25c wherein the top portion 25 is provided with a pawl 26, and wherein the tail portion 25c is provided with a sleeve 27. Each split nozzle member 25 is pivotally connected to the ring 16 through a bracket 30 and a pin 31. The split nozzle members 25 are arranged around the periphery of the sliding nozzle 3. All the split nozzle members 25 are held by an elastic material 29, such as a rubber band, thereby urging their top portions 25b toward the inside of the stationary nozzle 2. In this way the end of the nozzle is diverged.

There is provided a casing binding unit 32 located ahead of the casing holder 20 including a circular opening 33 and a pair of punches 34 and 35 in the upper and the lower positions, whereby the fastening clip is pressed to bind the casing.

Figure 3:
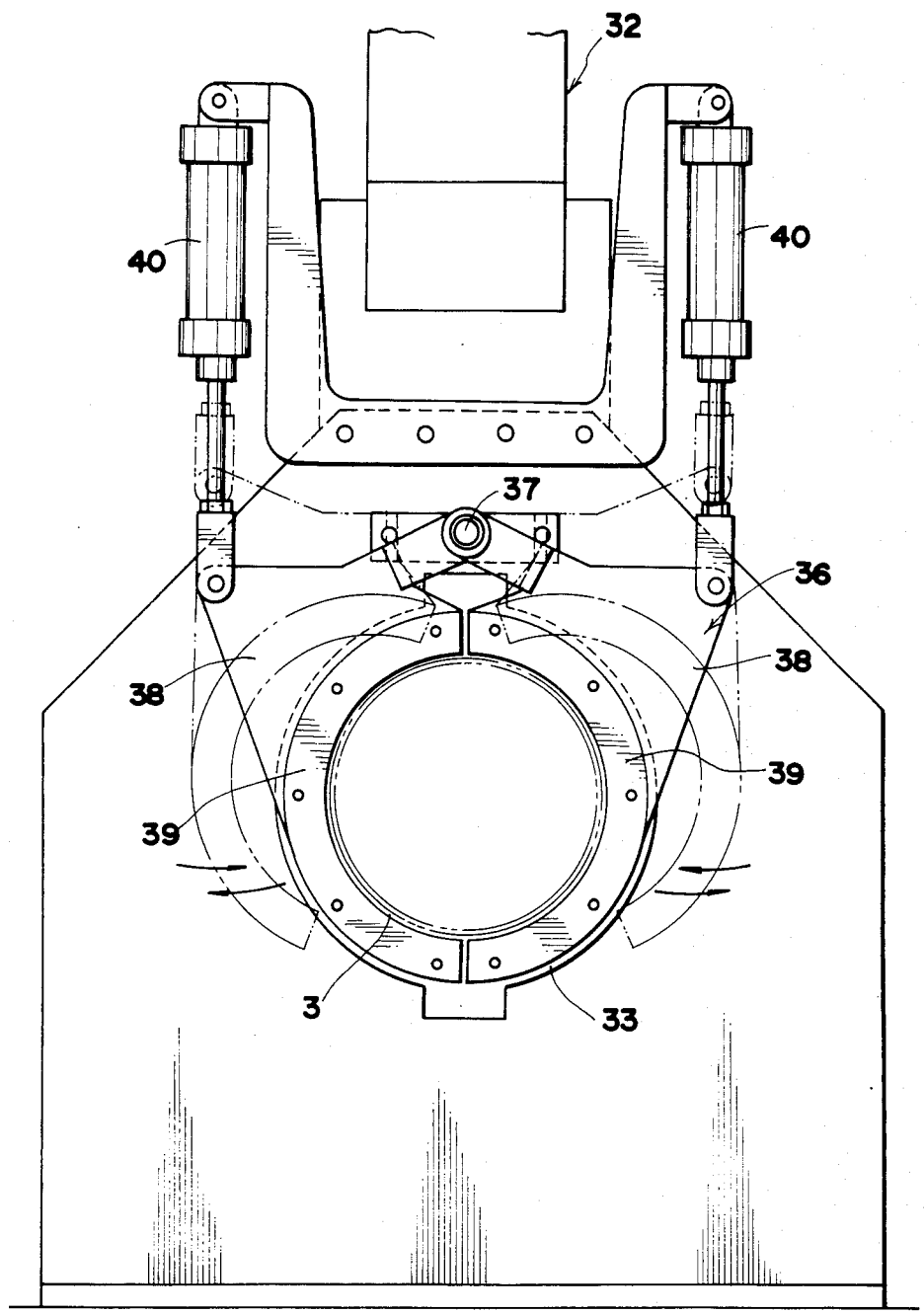
FIG. 3 is a side view viewed from the line 3—3 in FIG. 1.

There is provided a casing contact unit 36 located ahead of the casing binding unit 32, and as shown in FIG. 3, the unit 36 includes a pair of crescent members 38 rotative about a shaft 37, each of the crescent members being provided with a semi-circular press plate 38 shaped so as to be complemental with the outer surface of the sliding nozzle 3. The crescent members 38 are closed by means of a pneumatic cylinder 40, thereby enabling the casing to come into contact with the outer surface of the sliding nozzle.

The apparatus is operated as follows:

The tubular casing 45 is axially supplied by an automatic supplying machine (not shown). As shown in FIG. 4 the casing is inserted through the casing holder 20 until its open end 45a is caused to mount on the slightly diverged top portions 25b of the split nozzle members 25b. The cylinder 14 is operated, thereby causing the piston rod 15 to lower. As a result the sliding nozzle 3 is advanced through the link 13 and the yoke 8.

In accordance with the advance of the sliding nozzle 3 the top portions 25b of the split nozzle member 25 are radially expanded against the elastic rubber band 29. As a result of their radial expansion the top portions 25b are placed in contact with the ring liner 22 of the casing holder 20, thereby locating the open end 45a of the casing 45 between the pawls 26 and the grooves 24. In this way the sliding nozzle 3 is covered with the spread casing 45. The sliding nozzle 3 advances ahead of the casing closing unit 36, and stops. Then the cylinder 40 is operated, thereby closing the crescent members 38 as indicated by the lines in FIG. 3. Thus the casing 45 is pressed by the semi-circular press plates 38 at opposite sides, thereby enabling the casing to come into contact with the outer surface of the sliding nozzle 3. The gap between the sliding nozzle 3 and the stationary nozzle 2 is sealed by the seal ring 5.

In this way the casing 45 is held at the top portion of the sliding nozzle 3 and at a point adjacent to the top portion of the stationary nozzle 2 in such a manner as to be placed in contact with the outer surface of the sliding nozzle 3. At this stage a given amount of meat (M) is extruded through the inject port 1 by the piston 47, and introduced into the casing 45 through the nozzles 2 and 3. In the process of injection the liquid contents of the meet (M) is prevented from leaking through the gaps between the sliding nozzle 3 and the casing 45, and those between the stationary nozzle 2 and the sliding nozzle 3. This protects the apparatus against becoming stained with the liquids, such as pickles and meat juice, which would cause corrosion and unsanitary problems.

After the meat (M) has been stuffed in the casing 45, and the piston 47 and the sliding nozzle 3 have been withdrawn, the casing binding unit 32 is automatically operated so as to bind the open end 45a of the casing 45 with a clip 46 by the punches 34, 35. The meat (M) is pushed out beyond the top portion of the casing contact unit 36, thereby protecting the meat (M) against being pinched. This leads to trouble-free binding of the casing 45 with the clip 46.

In the foregoing description the meat (M) is in the state of lump but can be in the state of paste.

What we claimed is:

1. A filling nozzle device for use in stuffing meat in a continuous tubular casing, the device comprising:
   a meat extruder;
   an inner nozz-le secured to the meat extruder;
   an outer nozzle sliding on the inner nozzle;
   a casing holding means located ahead of the inner nozzle, and coaxially thereof, the holding means having an inside diameter larger than the outside diameter of the sliding nozzle;
   a plurality of split nozzle members arranged around the periphery of the inner nozzle in such a manner that their top portions are inwardly urged by an elastic material, and located within the casing holding means;
   a casing binding means provided ahead of the casing holding means, the binding means including a pair of punches adapted to affix a clip to the open end of the casing;
   a casing contact means including a pair of semicircular abutments adapted to be kept in contact with the outer surface of the casing; and
   whereby the sliding nozzle is advanced until it projects through the casing contact means, in the course of advance it expands the split nozzle members so as to urge them toward the casing holding means until the casing is held between the split nozzle members and the casing holding means, and wherein the casing is kept in contact with the outer surface of the sliding nozzle by the casing contact means.

2. A filling nozzle device as set forth in claim 1, wherein the casing holding means is lined with a seal ring.

3. A filling nozzle device as set forth in claim 1, wherein the casing contact means comprises a pair of plate members capable of closing and opening, each plate member being provided with semi-circular abutment adapted to be complementary with the outer surface of the sliding nozzle.

* * * * *